US008922539B2

(12) United States Patent
Choe

(10) Patent No.: US 8,922,539 B2
(45) Date of Patent: Dec. 30, 2014

(54) DISPLAY DEVICE AND CLOCK EMBEDDING METHOD

(75) Inventor: Weon-Jun Choe, Seoul (KR)

(73) Assignee: Samsung Display Co., Ltd. (KR)

( * ) Notice: Subject to any disclaimer, the term of this patent is extended or adjusted under 35 U.S.C. 154(b) by 831 days.

(21) Appl. No.: 12/433,339

(22) Filed: Apr. 30, 2009

(65) Prior Publication Data

US 2009/0284509 A1 Nov. 19, 2009

(30) Foreign Application Priority Data

May 19, 2008 (KR) ........................ 10-2008-0046198

(51) Int. Cl.

*G09G 5/00* (2006.01)
*G06F 3/038* (2013.01)
*G09G 3/20* (2006.01)
*G09G 3/36* (2006.01)

(52) U.S. Cl.

CPC ............ *G09G 3/2096* (2013.01); *G09G 3/2088* (2013.01); *G09G 3/3648* (2013.01); *G09G 3/3685* (2013.01); *G09G 2320/06* (2013.01); *G09G 2320/0626* (2013.01); *G09G 2320/08* (2013.01); *G09G 2370/04* (2013.01)

USPC .......................................... 345/208; 345/204

(58) Field of Classification Search

CPC ..... G09G 3/20; G09G 3/2011; G09G 3/3614; G09G 3/3648; G06F 9/3877

USPC .......................................................... 345/208

See application file for complete search history.

(56) References Cited

U.S. PATENT DOCUMENTS

| | | | | |
|---|---|---|---|---|
| 4,345,323 | A * | 8/1982 | Chang | 370/212 |
| 6,151,334 | A * | 11/2000 | Kim et al. | 370/468 |
| 6,160,543 | A * | 12/2000 | Chen | 345/213 |
| 2005/0147178 | A1* | 7/2005 | Kikuchi | 375/288 |
| 2005/0168420 | A1* | 8/2005 | Chung | 345/87 |
| 2005/0168429 | A1* | 8/2005 | Chou | 345/100 |
| 2006/0222089 | A1* | 10/2006 | Dicky | 375/259 |
| 2006/0290641 | A1* | 12/2006 | Ku et al. | 345/98 |
| 2007/0132701 | A1* | 6/2007 | Jeon | 345/100 |
| 2007/0146292 | A1* | 6/2007 | Li et al. | 345/100 |

FOREIGN PATENT DOCUMENTS

| | | |
|---|---|---|
| JP | 2006-18154 | 1/2006 |
| JP | 2006-154835 | 6/2006 |
| JP | 2006-350341 | 12/2006 |
| JP | 2007-41591 | 2/2007 |
| KR | 10-2005-0078981 A | 8/2005 |
| KR | 10-2005-0079141 A | 8/2005 |
| KR | 10-0653159 | 11/2006 |
| KR | 10-0701086 | 3/2007 |
| KR | 10-0719362 | 5/2007 |

* cited by examiner

*Primary Examiner* — Andrew Sasinowski
*Assistant Examiner* — Mihir Rayan
(74) *Attorney, Agent, or Firm* — Innovation Counsel LLP

(57) ABSTRACT

An image display device employs an interface protocol wherein integrated image plus control data is transmitted from a signal controller circuit to each of a plurality of master data driving circuits. The integrated image plus control data includes display control data as well as image-defining data. The signal controller circuit determines which of a plurality of data driving circuits is to function as a master data driving chip and which as a slave data driving chip. The signal controller circuit directly transmits respective integrated image plus control data signals to corresponding ones of the master data driving chips. Each master data driving chip then forwards part of the received integrated image plus control signal to its corresponding slave data driving chip.

15 Claims, 8 Drawing Sheets

DISPLAY DEVICE AND CLOCK EMBEDDING METHOD

This application claims priority from Korean Patent Application No. 10-2008-0046198 filed on May 19, 2008 in the Korean Intellectual Property Office, the disclosure of which application is incorporated herein by reference in its entirety.

BACKGROUND

1. Field of Invention

The present disclosure of invention relates to a display device and a control signal embedding method used by such a display device. More particularly, the disclosure relates to a display device which employs a new interface to serially transmit image data and control data from a signal controller to each of a plurality of data driving chips, and to a control embedding and extracting method used by such a display device.

2. Description of Related Technology

A display device may include a signal controller circuit, a gate driver circuit, a data driver circuit, and a display panel. The signal controller may transmit gate control signals to the gate driver and may transmit image data signals plus data control signals to the data driver. The gate driver circuit may include a plurality of gate driving chips, and the data driver circuit may include a plurality of data driving chips. Each of the gate driving chips may provide gate signals to a corresponding one or more gate lines, and each of the data driving chips may provide image data voltage levels, which correspond to received image data signals, to a corresponding one or more data lines.

Multi-drop methods and point-to-point methods have been separately suggested as possible interfaces for transmitting the image data signals and the data control signals from the signal controller circuit to each of the data driving chips.

However, as display devices become capable of providing higher resolutions (e.g., more pixels or subpixels per frame) and wider color gamuts (e.g., a greater number of discrete colors), the amount of signaling bandwidth needed grows. Thus, an interface which can be used to transmit the wider bandwidth image data signals plus the data control signals from the signal controller to each of the data driving chips in a more efficient and stable manner becomes desirable.

SUMMARY

The present disclosure provides a display device which employs a new interface to transmit image plus control data from a signal controller to one or more data driving chips.

Aspects of the present disclosure include providing a control signal embedding method for use by a display device which employs the new interface, where the interface serially transmits data from a signal controller thereof to each of plural data driving chips.

However, the present disclosure is not restricted to the specific embodiments detailed herein. Various aspects of the present disclosure of invention will become apparent to those of ordinary skill in the art to which the present disclosure most pertains by referencing the detailed description given below.

According to one aspect of the present disclosure, there is provided a display device including: a signal controller which provides a serially transmitted, integrated signal having image data plus optional control data serially embedded in the integrated signal; and a plurality of data driving chips, each of which receives the integrated signal and each of which is determined to be either a master data driving chip or a slave data driving chip, wherein each master data driving chip is driven by a first integrated signal received directly from the signal controller, and wherein each of the slave data driving chips is driven by a second integrated signal received from a corresponding master data driving chip. In one embodiment, master data driving chips operate at a higher switching rate than their corresponding slave data driving chips.

According to another aspect of the present invention, there is provided a display device including: a plurality of data driving chips; and a signal controller which determines which of the data driving chips is to function as a master data driving chip, which is to function as a slave data driving chip and which signal controller then provides the integrated signal accordingly. The integrated signal has a data control signal embedded in it along with an image data signal and different versions of the controller output integrated signal are sent to each of the data driving chips according to whether the receiving data driving chip is a master or a slave data driving chip.

According to another aspect of the present disclosure, there is provided a control embedding method including generating an integrated signal by embedding a data control signal with an image data signal by using a plurality of pulses, each having a fixedly positioned rising edge (chronologically speaking) and a variably positioned falling edge. Information represented by each of the variable width pulses is determined based on the temporal position of the falling edge of each such pulse. On the other hand, clock reconstruction data is obtained from the fixedly positioned rising edges. Of course, it is within the contemplation of the disclosure to have fixed falling edges and variably positioned rising edges.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
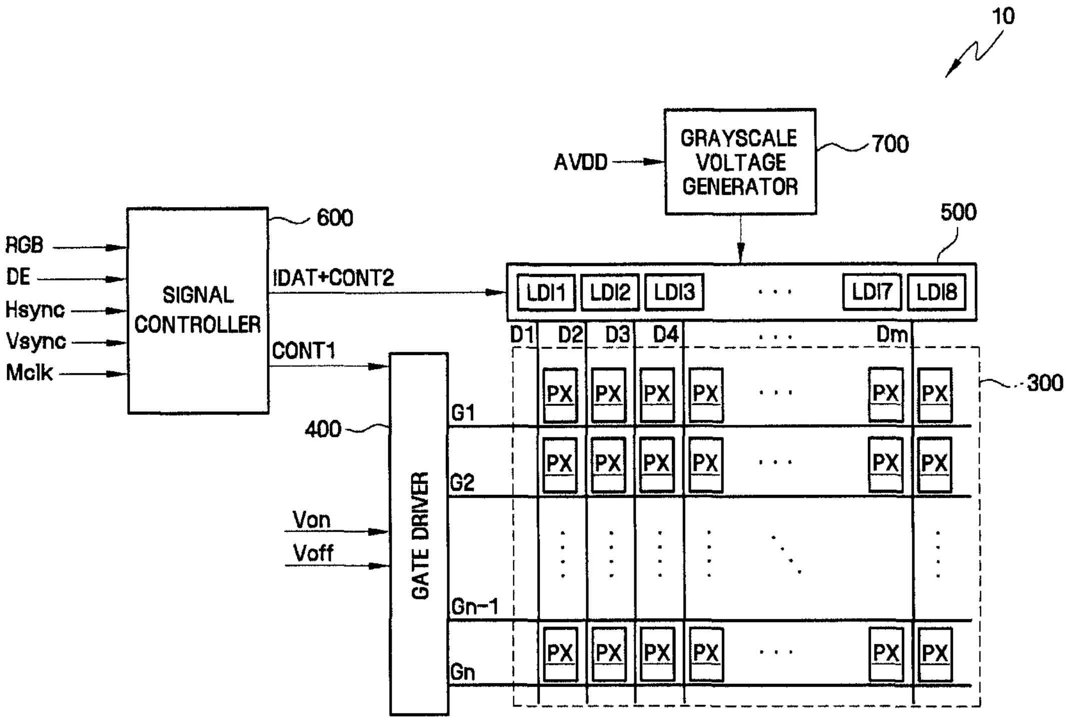
FIG. 1 is a block diagram for explaining a display device according to an exemplary embodiment.

Advantages and features of the present disclosure of invention and methods of accomplishing the same may be understood more readily by reference to the following detailed description of exemplary embodiments and the accompanying drawings. The here disclosed concepts may, however, be embodied in many different forms and should not be construed as being limited to the specific embodiments set forth herein. Rather, these embodiments are provided so that this disclosure will be thorough and complete and will fully convey its concepts to those skilled in the art. Like reference numerals refer to like elements throughout the specification.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the meaning as commonly understood by one of ordinary skill in the art to which this disclosure most closely pertains and in view of context of usage herein. It will be further understood that terms, such as those defined in commonly used dictionaries, should be interpreted as having a meaning that is consistent with their meaning in the context of the present disclosure and should not be interpreted in an idealized or overly formal sense unless expressly so defined herein.

Figure 2:
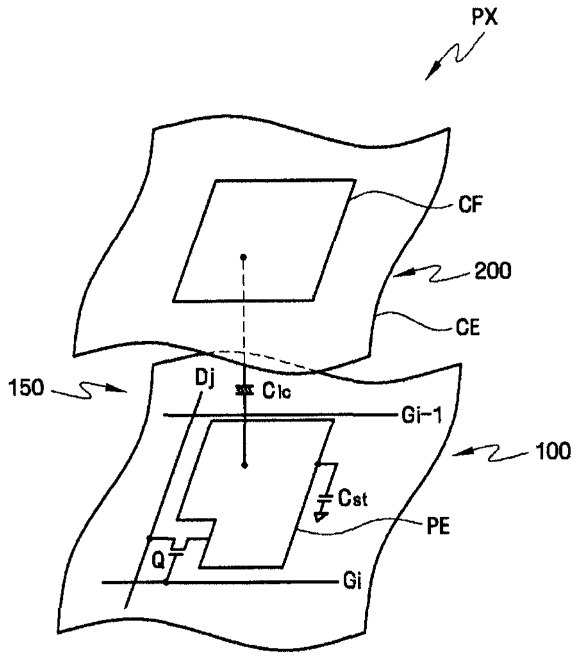
FIG. 2 is an equivalent circuit diagram of a pixel unit included in a display panel of FIG. 1.

Hereinafter, a display device according to a first exemplary embodiment will be described with reference to FIGS. 1 and 2. FIG. 1 is a block diagram for explaining a display device 10 according to the first exemplary embodiment. FIG. 2 is an equivalent circuit diagram of a pixel PX included in a display panel 300 of FIG. 1.

Referring to FIG. 1, the display device 10 includes the display panel 300, a signal controller circuit 600, a gate driver circuit 400, a data driver circuit 500, and a grayscale voltage generator 700. One or more of the illustrated circuits may be in the form of a corresponding one or more monolithic integrated circuits. The circuits may be provided on a common substrate or printed circuit board or they may be provided on interconnected boards and/or substrates.

In one embodiment, the display panel 300 is provided on a transparent substrate and it includes a plurality of gate lines G1 through Gn, a plurality of data lines D1 through Dm, and a plurality of individually-addressable pixel or subpixel units, PX arranged in matrix form. It is understood that as the values of the whole numbers, m and n increase, the resolution of the displayed image and/or the color gamut of the displayed image may be increased. And indeed, as mentioned above, the historical trend in the industry is to keep increasing at least the value of m (number of data lines) and thus the number of independently drivable pixel or subpixel units, PX per row. The gate lines G1 through Gn extend in a substantially row direction to be substantially parallel to each other, and the data lines D1 through Dm extend in a substantially column direction to be substantially parallel to each other. Each of the pixel units PX is defined in a region bounded by where the gate lines G1 through Gn and the data lines D1 through Dm cross each other. The gate driver circuit 400 transmits a respective gate signal to each of the gate lines G1 through Gn, and the data driver 500 transmits a respective image data signal to each of the data lines D1 through Dm. Each of the pixel or subpixel units PX may then display a pixel or subpixel image component in response to the image data signal supplied to it by a driving data line, Dj in conjunction with an active gate signal supplied via its respective gate line, Gi (where $1 \geq j \geq m$ and $1 \geq i \geq n$).

As described above, FIG. 2 is an equivalent circuit diagram of one pixel unit, PX. Referring to FIG. 2, the pixel unit PX is connected to, for example, an $i^{th}$ (i=1 to n) gate line Gi and a $J^{th}$ (j=1 to m) data line Dj and includes a switching device Qij (e.g., a TFT or other transistor), which is connected to the $i^{th}$ gate line Gi and the $j^{th}$ data line Dj, and a liquid crystal capacitor, Clc and a storage capacitor, Cst which are connected to the switching device Qij. The liquid crystal capacitor Clc may include two electrodes, for example, a pixel electrode PE disposed on a first display substrate 100 and a common electrode CE disposed on a spaced apart second display substrate 200, and liquid crystal molecules 150 which are interposed between the first and second substrates. A color filter CF is formed on a corresponding portion of the second substrate 200 for giving the pixel or subpixel PX its respective color (e.g., R,G,B or R,G,B,W).

Referring back to FIG. 1, the signal controller circuit 600 receives an original image signal (e.g., RGB) and external control signals for controlling the display of the original image signal RGB and in response it outputs an integrated signal which contains image data plus optional control data, IDAT+CONT2, where the data control signal CONT2 is serially embedded among serial runs of the image data signal IDAT. The signal controller circuit 600 also outputs a gate control signal CONT1.

Specifically, the signal controller circuit 600 may receive the original image signal RGB and convert the received original image signal RGB into the image data signal IDAT corresponding to the resolution and/or color gamut of the display panel 300. The image data signal IDAT may be a signal into which the original image signal RGB was converted for improvement of display quality and/or reduction of power consumption (e.g., by use of local backlight dimming). Alternatively, the image data signal IDAT may be a signal into which the original image signal RGB was converted for providing a prespecified overdriving function (e.g., for use in conjunction with a local backlight overdrive technique).

In addition, the signal controller 600 may receive various external control signals from an external source and may generate the data control signal CONT2 and the gate control signal CONT1 accordingly. Examples of such external control signals include a vertical synchronization signal Vsync, a horizontal synchronization signal Hsync, a main clock signal Mclk, and a data enable signal DE. The controller-generated gate control signal CONT1 is used to control the operation of the gate driver 400, and the controller-generated data control signal CONT2 is used to control the operation of the data driver 500.

The signal controller 600 may generate the integrated signal, IDAT+CONT2 having embedded therein the data control signal CONT2, where the latter was generated based on the external control signals received from the external source. As will be seen, portions of the data control signal CONT2 are serially embedded alongside corresponding portions of the image data signal IDAT, where the latter was derived from the original image signal (e.g., RGB) by appropriate conversion. The signal controller 600 assembles the integrated signal IDAT+CONT2 for providing the same to the data driver circuitry 500 while the latter data driver circuitry 500 receives the integrated signal IDAT+CONT2 and disassembles it for distribution of respective portions thereof to corresponding data lines in the display unit 300.

In one embodiment, the signal controller 600 is responsible for designating each of a plurality of associated data-line driving chips (e.g., LDI1 through LDI8 in the case where there are 8 such chips) to be either of a master type or of a slave type. The designation may be in accordance with designation software code loaded into the signal controller 600. Then depending on how the signal controller 600 designated the masters and slaves, the signal controller 600 correspondingly assembles the integrated signal IDAT+CONT2, which has the data control signal CONT2 embedded with the image data signal IDAT, and causes all or appropriate parts of the assembled integrated signal IDAT+CONT2 to be delivered to each of the data driving chips LDI1 through LDI8 according to the determined type of that data driving chip. The integrated signal IDAT+CONT2 and the provision thereof will be described later with reference to FIGS. 3 through 5B.

Although not shown in FIG. 1, in one embodiment, the gate driver circuit 400 may include a plurality of gate driving chips (not shown), and each of these gate driving chips may receive the gate control signal CONT1 from the signal controller 600 and transmit a corresponding, row activating or row deactivating gate signal to a corresponding one of the gate lines G1 through Gn. In other words, the gate signal may include a gate-on voltage level, Von and a gate-off voltage level, Voff provided by a gate on/off voltage generator (not shown). The gate control signal CONT1 is used to control the operation and timing of the gate driver 400 and may include a vertical start signal for starting the gate driver 400, a gate clock signal for determining when to output the gate-on voltage level Von to each of the gate lines, and an output enable signal for determining the pulse width of the gate-on voltage levels, Von.

The data driver circuit 500 may include a plurality of data chips (e.g., monolithic integrated circuit chips) LDI1 through LDI8, and each of the data driving chips LDI1 through LDI8 may receive the whole or a portion of the controller-assembled, integrated signal IDAT+CONT2, which has the data control signal CONT2 embedded alongside the image data signal IDAT. Each receiving data driving chip may internally divide (disassemble) the integrated signal IDAT+CONT2 into the separate image data signal IDAT and the data control signal CONT2 intended for it and may respond to each accordingly. Then, each of the data chips LDI1 through LDI8 may convert the image data signal IDAT into a corresponding analog signal and transmit the analog signal to its corresponding one(s) of data lines D1 through Dm driven by that lines-driving data chip. The analog signal, i.e., which is an analog expression of the digital image data signal IDAT, is transmitted to each of the data lines D1 through Dm. The analog signal may be a voltage level provided by the grayscale voltage generator 700. The data control signal CONT2 is used to control the operation of the data driver 500 and may include a horizontal start signal for starting the data driver 500 and an output instruction signal for instructing the output of an image data signal.

The grayscale voltage generator 700 may divide a driving voltage level AVDD (e.g., a reference level) according to a gray level scale associated with the image data signal IDAT and the grayscale voltage generator 700 may provide the corresponding divided driving voltage AVDD to the data driver 500. The grayscale voltage generator 700 may include a plurality of resistors (or equivalents) connected in series between a node, to which the driving voltage AVDD is applied, and a ground source in order to divide the level of the driving voltage AVDD and thus generate a plurality of grayscale voltages. The internal circuit of the grayscale voltage generator 700 is not limited to the above example and may be implemented in various other ways (e.g., capacitive voltage division).

Figure 3:
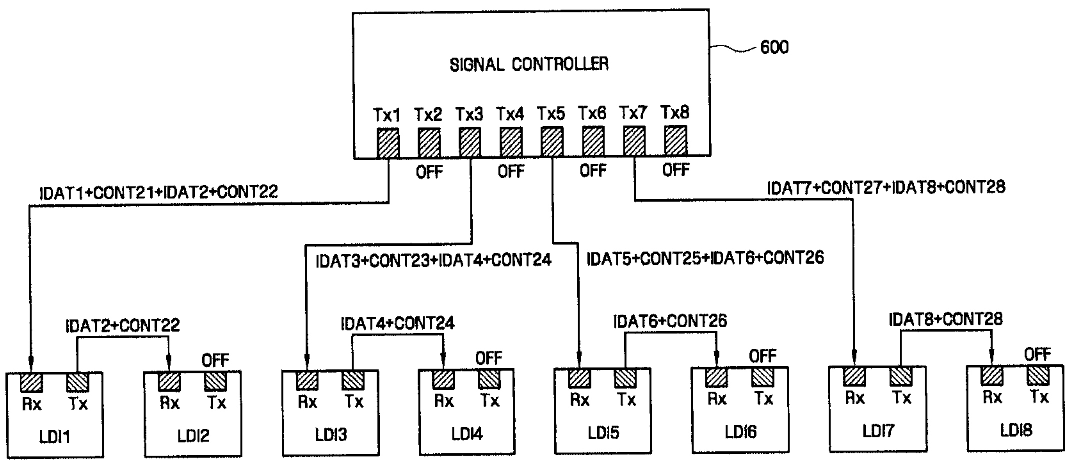
FIG. 3 is a block diagram illustrating signal transmission between a signal controller of FIG. 1 and a data driver of FIG. 1 when in a first transmission mode.
Figure 4:
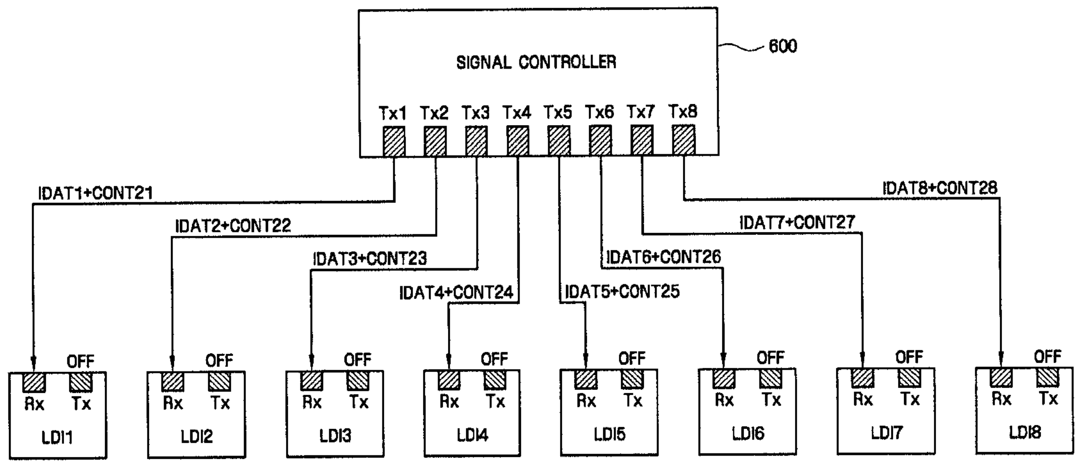
FIG. 4 is a block diagram illustrating signal transmission between the signal controller of FIG. 1 and the data driver of FIG. 1 when in a second transmission mode.

FIG. 3 is a block diagram illustrating a first form of signal transmission between the signal controller 600 of FIG. 1 and the data driver 500 of FIG. 1 when in a first transmission mode. FIG. 4 is a block diagram illustrating a second form of signal transmission between the signal controller 600 of FIG. 1 and the data driver 500 of FIG. 1 when in a second transmission mode.

In FIGS. 3 and 4, reference characters IDAT1 through IDAT8 respectively indicate image data signals provided for respective consumption by the eight data driving chips LDI1 through LDI8, respectively. Reference characters CONT21 through CONT28 indicate respective data control signals provided to control the respective data driving chips LDI1 through LDI8. In addition, reference characters Tx1 through Tx8 indicate signal transmitting (outputting) terminals (e.g., IC package pins) of the signal controller circuit 600, and reference character Tx indicates a signal transmitting (outputting) terminal (e.g., IC package pin) of each of the data driving chips LDI1 through LDI8. Reference character Rx indicates a signal receiving terminal of each of the data driving chips LDI1 through LDI8. The reference character OFF indicates a state in which a signal transmitting terminal or a signal receiving terminal is intentionally turned off so that it neither actively transmits a signal nor responds to a received signal. In one embodiment, OFF may represent a high impedance terminal mode.

Referring to FIG. 3, in the first transmission mode, the data driving chips LDI1 through LDI8 may be divided into master and slave data driving chips. In FIG. 3, the odd numbered data driving chips, LDI1, LDI3, LDI5 and LDI7 were designated by the controller 600 to be such master data driving chips, and the even numbered data driving chips, LDI2, LDI4, LDI6 and LDI8 were designated to be slave data driving chips. Hereinafter, an integrated signal used to drive a master data driving chip (e.g., the data driving chips LDI1, LDI3, LDI5 and LDI7) will be referred to as a first integrated signal, and an integrated signal used to drive a slave data driving chip (e.g., the data driving chips LDI2, LDI4, LDI6 and LDI8) will be referred to as a second integrated signal.

The signal controller 600 assembles for output and provides to the corresponding master chips, the following pairs of first and second integrated signals IDAT1+CONT21+IDAT2+CONT22, IDAT3+CONT23+IDAT4+CONT24, IDAT5+CONT25+IDAT6+CONT26, and IDAT7+CONT27+IDAT8+CONT28. In other words, the four recited assemblages are provided to the master data driving chips LDI1, LDI3, LDI5 and LDI7, respectively. Here, the pairs of the first and second integrated signals IDAT1+CONT21+IDAT2+CONT22, IDAT3+CONT23+IDAT4+CONT24, IDAT5+CONT25+IDAT6+CONT26, and IDAT7+CONT27+IDAT8+CONT28 may be provided to the master data driving chips LDI1, LDI3, LDI5 and LDI7 in a point-to-point connection manner. The transmission channel may be parallel or serial or various hybrids of both types of signal transmission approaches. Also the signal transmission may be synchronous (with clock provided on a separate line) or asynchronous (e.g., with clock recovered by regenerating from data provided in the asynchronous transmission). In general, control data which is not always present, is interspersed when present chronologically with image data and transmitted along the same transmission channel. A means for signaling the start of control data and thus distinguishing between image data and control data is provided as will be seen shortly.

Operations of the odd-numbered master data driving chips LDI1, LDI3, LDI5 and LDI7 may be controlled by respective first portions of the first integrated signals, namely, by the portions IDAT1+CONT21, IDAT3+CONT23, IDAT5+CONT25 and IDAT7+CONT27. At the same time, the odd-numbered master data driving chips may parse out and forward to their respective slave chips, respective second portions of the integrated signals, namely, IDAT2+CONT22, IDAT4+CONT24, IDAT6+CONT26 and IDAT8+CONT28 to the even-numbered slave data driving chips LDI2, LDI4, LDI6 and LDI8, respectively. In one embodiment, the second integrated signals IDAT2+CONT22, IDAT4+CONT24, IDAT6+CONT26 and IDAT8+CONT28 may be temporarily stored in the master chips and then transmitted respectively to the slave data driving chips LDI2, LDI4, LDI6 and LDI8 in a cascade manner.

In summary, the master data driving chips LDI1, LDI3, LDI5 and LDI7 may be controllably driven respectively by the first integrated signals IDAT1+CONT21, IDAT3+CONT23, IDAT5+CONT25 and IDAT7+CONT27 received directly from the signal controller 600. On the other hand, the slave data driving chips LDI2, LDI4, LDI6 and LDI8 may be controllably driven respectively by the second integrated signals IDAT2+CONT22, IDAT4+CONT24, IDAT6+CONT26 and IDAT8+CONT28 received indirectly from the signal controller 600 and forwarded via the respective master data driving chips LDI1, LDI3, LDI5 and LDI7 to the targeted slave data driving chips LDI2, LDI4, LDI6 and LDI8 respectively.

The first transmission mode may be performed when a data outputting rate required by each of the data driving chips LDI1 through LDI8 (to respectively driven data lines of the display) is equal to or less than a first predetermined rate. The first predetermined rate may be, for example, about half the maximum data transmission rate allowed between the signal controller 600 and each of the data driving chips LDI1 through LDI8.

In the first transmission mode, the pairs of the first and second integrated signals IDAT1+CONT21+IDAT2+CONT22, IDAT3+CONT23+IDAT4+CONT24, IDAT5+CONT25+IDAT6+CONT26 and IDAT7+CONT27+IDAT8+CONT28 may be transmitted from the signal controller 600 to the master data driving chips LDI1, LDI3, LDI5 and LDI7, respectively, at a relatively high first transmission rate. In addition, the second integrated signals IDAT2+CONT22, IDAT4+CONT24, IDAT6+CONT26 and IDAT8+CONT28 may be transmitted from the master data driving chips LDI1, LDI3, LDI5 and LDI7 to the slave data driving chips LDI2, LDI4, LDI6 and LDI8, respectively, at a second relatively lower transmission rate. In one embodiment, the second transmission rate is equal to or less than half the first transmission rate.

Referring to FIG. 4, in the second transmission mode, the data driving chips LDI1 through LDI8 were all determined to be master data driving chips.

The signal controller 600 provides first integrated signals IDAT1+CONT21, IDAT2+CONT22, IDAT3+CONT23, IDAT4+CONT24, IDAT5+CONT25, IDAT6+CONT26, IDAT7+CONT27 and IDAT8+CONT28 to the eight master data driving chips LDI1 through LDI8, respectively, and the master data driving chips LDI1 through LDI8 are controllably driven by the received first integrated signals IDAT1+CONT21, IDAT2+CONT22, IDAT3+CONT23, IDAT4+CONT24, IDAT5+CONT25, IDAT6+CONT26, IDAT7+CONT27 and IDAT8+CONT28, respectively. Here, the first integrated signals IDAT1+CONT21, IDAT2+CONT22, IDAT3+CONT23, IDAT4+CONT24, IDAT5+CONT25, IDAT6+CONT26, IDAT7+CONT27 and IDAT8+CONT28 may be transmitted respectively to the master data driving chips LDI1 through LDI8 in a point-to-point manner.

The second transmission mode may be performed when a data transmission rate required by each of the data driving chips LDI1 through LDI8 exceeds a predetermined second rate. The predetermined second rate may be, for example, about half the maximum data transmission rate allowed between the signal controller 600 and each of the master data driving chips LDI1 through LDI8.

In summary, in the first transmission mode, that is, when a data transmission rate required by each of the data driving chips LDI1 through LDI8 is equal to or less than a predetermined rate, data is partially transmitted in a cascade manner. In the second transmission mode, that is, when the data transmission rate required by each of the data driving chips LDI1 through LDI8 exceeds the predetermined rate, data is transmitted in a point-to-point manner.

Compared to the second transmission mode, the first transmission mode may be carried out with a substantially smaller number of high frequency transmission lines being used to transmit data from the signal controller 600 to all of the data driving chips LDI1 through LDI8. Device reliability can be increased when the number of lines required to be operable high frequency transmission lines is reduced. Furthermore, since the first or second transmission mode is determined based on a data transmission rate required by each of the data driving chips LDI1 through LDI8, data can be transmitted more efficiently when such is possible. The signal controller circuit 600 of the present disclosure is structured to be able to operate according to either one of the first and second transmission modes.

Figure 5A:
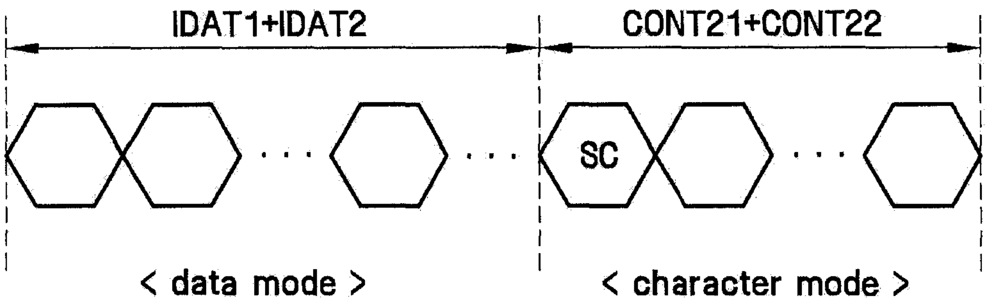
FIG. 5A is a diagram for explaining a signal transmitted from the signal controller of FIG. 1 to each master data driving chip shown in FIG. 3.
Figure 5B:
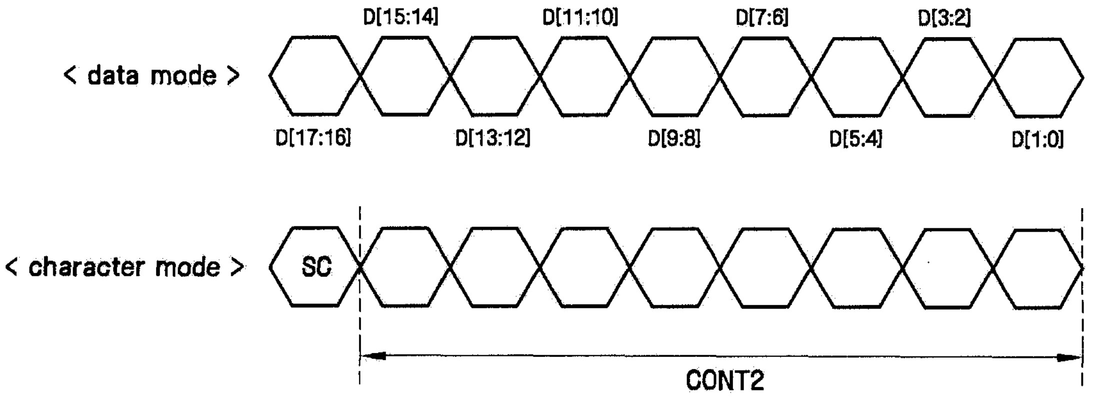
FIG. 5B is a diagram illustrating the signal of FIG. 5A which is divided according to modes.
Figure 6:
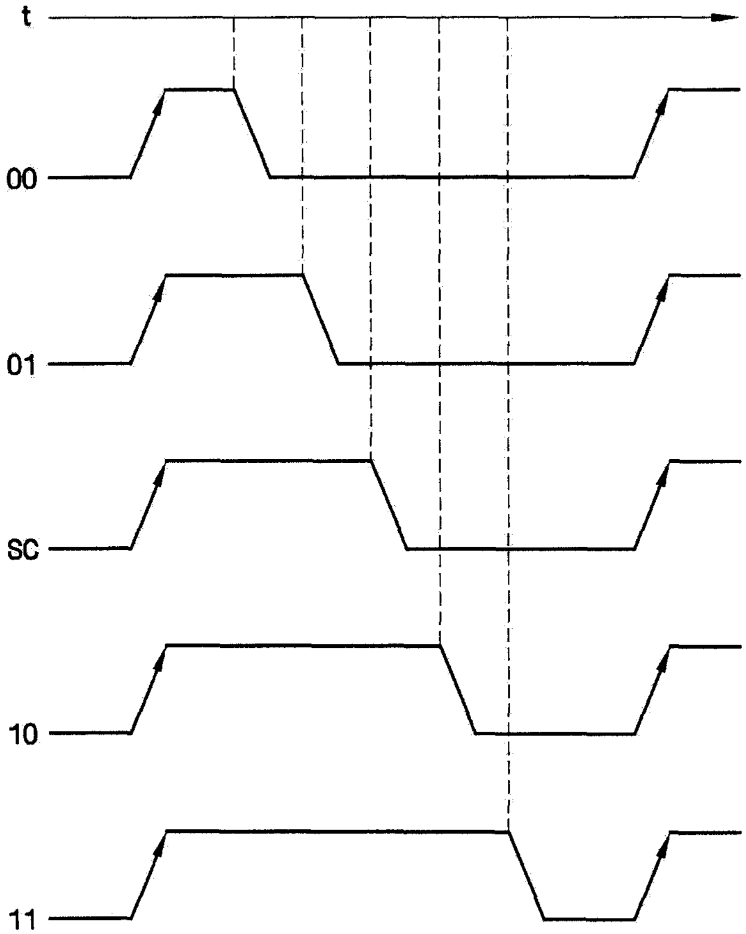
FIG. 6 is a timing diagram for explaining a control embedding method used by the display device of FIG. 1.

FIG. 5A is a diagram for explaining an assembled integrated signal as transmitted from the signal controller 600 to each of the master data driving chips LDI1, LDI3, LDI5 and LDI7 shown in FIG. 3. FIG. 5B is a diagram illustrating the signal of FIG. 5A which is divided according to modes. FIG. 6 is a timing diagram for explaining the control embedding method used by the display device 10 of FIG. 1. The signal illustrated in FIG. 5A is the pair of the first and second integrated signals IDAT1+CONT21+IDAT2+CONT22 which is provided to the data driving chip LDI1 shown in FIG.

3. However, the here given description of the pair of the first and second integrated signals IDAT1+CONT21+IDAT2+CONT22 provided to the data driving chip LDI1 may be applied substantially as the same for the other master data driving chips LDI3, LDI5 and LDI7.

Referring to FIGS. 5A and 5B, the pair of the first and second integrated signals IDAT1+CONT21+IDAT2+CONT22 provided by the signal controller 600 to the data driving chip LDI1 may include along the time line (chronologically) an image data mode section in which image data signals i.e., IDAT1+IDAT2 are being transmitted, and a control character mode section in which control signals i.e., CONT21+CONT22 are being transmitted.

The image data mode section IDAT1+IDAT2 may be of a fixed bit length defining for example eighteen data bits designated as 0 to 17 and presented as 2-bits per transmitted pulse so as to thereby represent 2-bit data pairs D[17:16] through D[1:0] of the image data signal IDAT. The control mode section CONT21+CONT22 may include a starting pulse represented by a reserved special character, SC, where the reserved special character indicates the start of the data control signal section, CONT2.

In the illustrated control mode section, the CONT21+CONT22, signals appear in the recited order subsequent to the special character SC and these control mode section signals contain information regarding the data control signal CONT2, not the image data signal IDAT. Therefore, in cases where only image data signals IDAT are being transmitted, and as a result the unique special character SC, does not appear (is not detected) after the expected first 18 image data pulses, D(17:16) through D(1:0), then at the first position after the image data section boundary, that is, at a temporal position where the special character SC is supposed to appear if at all but it does not, each of the subsequent signals after that specified image data boundary position is taken to again be an image data signal IDAT. In other words, if the reserved special character, SC, does not appear where expected, that is taken to mean that no control data was embedded and instead another 18 successive image data pulses, e.g.; D(35:34) through D(19:18) should be expected. On the other hand, if the reserved special character, SC, does appear where expected, that is taken to mean, in one embodiment, that the following 17 (or another predefined number of) data pulses represent control characters.

Therefore as described above, in one embodiment, a controller-assembled integrated signal may include characters of the data control signal CONT2 which are optionally embedded as strings of predefined length between predefined lengths of successive image data signal IDAT where each of the control characters and image data strings is represented by a plurality of clocked, variable width pulses, each having a firstly positioned rising edge (at a predefined first position along the time line) and a variably positioned falling edge (at a variable next position along the time line). A synchronizing data clock may be reconstructed out of the positionings of at least the fixedly positioned rising edges.

Referring to FIG. 6, in one embodiment, a respective two bits of information in the domain 00 to 11 are encoded by each of the illustrated clocked and variable width pulses (except the SC pulse), which has a fixedly positioned rising edge and a variably-placed falling edge. The two bit code may therefore be determined based on the position of the falling edge relative to the fixed rising edge of that clocked pulse. That is, pulse width, instead of a pulse level, is modulated in this embodiment to represent information, and the information may be transmitted, in particular, based on the relative position of the falling edge of each pulse relative to its immediately preceding and corresponding rising edge.

Each of the five distinct pulses illustrated in FIG. 6 respectively represents a 00 bit pair, a 01 bit pair, a 10 bit pair, a 11 bit pair, or the special character-mode-starting character, SC, this being determined according to the relative position of the falling edge of the pulse. In this case, each of 00, 01, 10 and 11 is a 2-bit bit pair of data, and the pulse representing the special character SC may have a unique pulse duration or associated duty ratio of, for example, 50% as shown in FIG. 6 so that special pulse detection may be based on detecting the median pulse duration and/or associated 50% duty cycle of the SC character pulse. In one embodiment, the next rising edge after a variably placed falling edge is fixedly positioned in time irrespective of where the falling edge falls. In an alternate embodiment, the next rising edge is positioned a predefined distance (e.g., one fine clock period) after the falling of the variably placed falling edge immediately before that next rising edge When data is transmitted by using a pulse width modulation transmission method such as illustrated in FIGS. 5A through 6, it tends to be more resistant to corruption by noise than data that is transmitted by relying on binary pulse levels because the detector is looking for relative edge directions and relative edge timings rather than specific analog levels. Thus, more stable data transmission can often be achieved. In addition, each variable-width pulse and the information represented by each such pulse and the underlying clock signal can be restored in a more stable manner. Also, since no additional analog circuitry is required to detect a specific analog pulse level and extract information from the detected analog pulse level, the transmission method is advantageous in terms of circuit design. In this regard, the image data signal IDAT, which may also include clock recovery information within the 2-bit bit pairs of data, and the embedded data control signal CONT2, which follows the special start character SC, can be transmitted together serially through a single transmission line while the circuit size is reduced.

The data control signal CONT2 may include a special first signal for identifying the start of a first integrated signal and a special second signal for identifying the start of a second integrated signal, which will be described later with reference to FIGS. 8A-8B.

Figure 7:
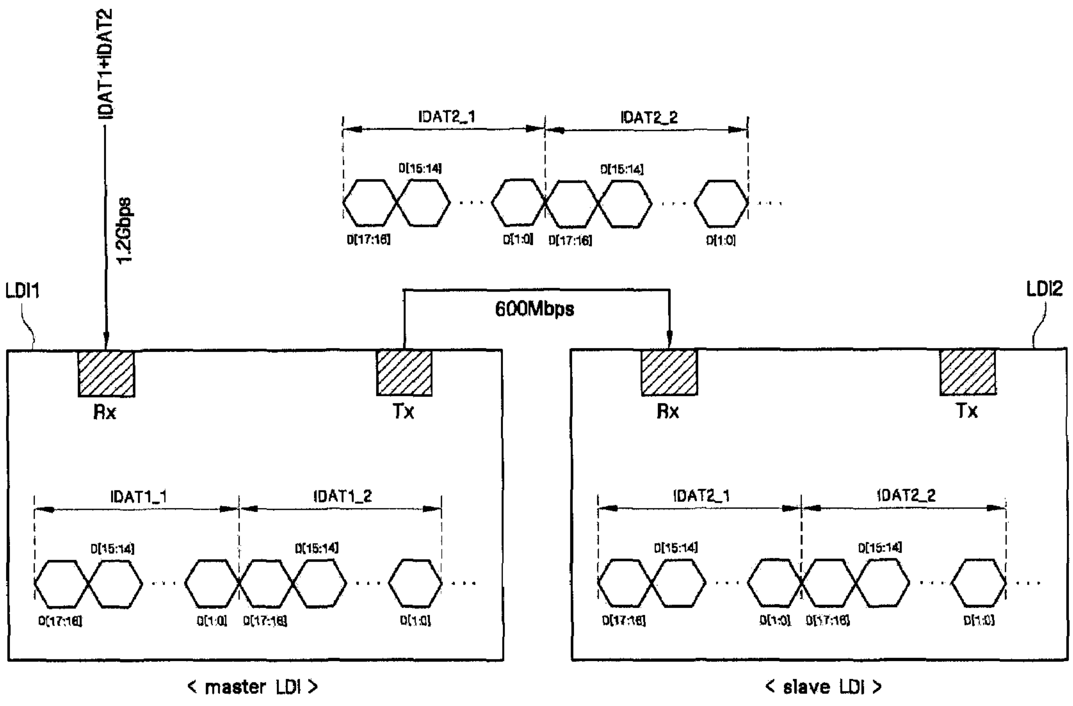
FIG. 7 is a conceptual diagram illustrating signal transmission between a master data driving chip and a slave data driving chip shown in FIG. 3.

FIG. 7 is a conceptual diagram illustrating signal transmission between the master data driving chip LDI1 and the slave data driving chip LDI2 shown in FIG. 3. FIG. 8A is a diagram for explaining a signal for identifying a first integrated signal and a signal for identifying a second integrated signal which are included in a pair of the first and second integrated signals provided to the master data driving chip LDI1 of FIG. 7. FIG. 8B is a diagram for explaining the arrangement of image data signals IDAT1_1, IDAT1_2, . . . and IDAT2_1, IDAT2_2, . . . included in the pair of the first and second signals provided to the master data driving chip LDI1 of FIG. 7. While the data driving chips LDI1 and LDI2 are illustrated in FIG. 7 as the master and slave data driving chips, respectively, a description of the signal transmission between the first and second data driving chips LDI1 and LDI2 is applicable in substantially the same way to the signal transmission between the other master data driving chips LDI3, LDI5 and LDI7 and the other slave data driving chips LDI4, LDI6 and LDI8, respectively. For simplicity, the optionally embedded data control signal CONT2 is not shown in FIG. 7.

Referring to FIG. 7, the image data signal IDAT transmitted to and received by the master chip LDI1, includes in the first integrated image signal IDAT1 and the second integrated image data signal IDAT2 and these are transmitted together, one after the next from the controller to the master data driving chip LDI1 at a first, relatively high rate (e.g., 1.2 Gbps—Giga bits per second) while the second image data signal IDAT2 alone is transmitted from the master chip LDI1 to the slave data driving chip LDI2 at a relatively smaller, second rate (e.g., 0.6 Gbps). Since the slave chip LDI2 tends to be physically located closer to the master chip LDI1 than to the controller chip, the length of transmission line from the master to the slave tends to be shorter than a hypothetical wire that would otherwise have been needed from the controller directly to the slave chip. Also, because the data rate on the master-to-slave line (e.g., 600 Mbps) is substantially lower, the master-to-slave linking line does not have to be of a same high quality (quality for carrying high frequency signals) as does the controller-to-master linking line.

Figure 8A:
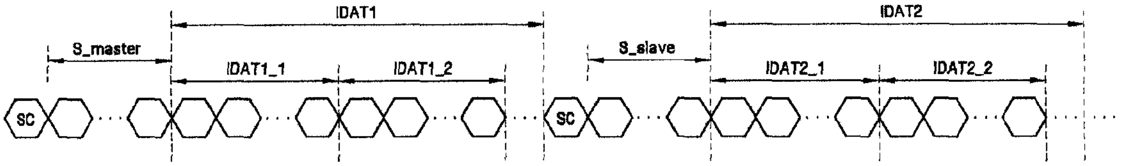
FIG. 8A is a diagram for explaining a signal for identifying a first integrated signal and a signal for identifying a second integrated signal which are included in a pair of the first and second integrated signals provided to the master data driving chip of FIG. 7.

Referring to FIG. 8A, in this embodiment the image data signal IDAT1 included in the first integrated signal contains the image data signals IDAT1_1, IDAT1_2, . . . for a first plurality of pixels associated with a first data driving chip LDI1 respectively, and the image data signal IDAT2 included in the second integrated signal contains the image data signals IDAT2_1, IDAT2_2, . . . for a second plurality of pixels, respectively associated with a second data driving chip LDI2.

The master data driving chip LDI1 transmits the image data signals IDAT1_1, IDAT1_2, . . . to some of the pixels PX included in the display panel 300 of FIG. 1, and the slave data driving chip LDI2 transmits the image data signals IDAT2_1, IDAT2_2, . . . to other ones of the pixels PX included in the display panel 300 of FIG. 1.

Referring to FIG. 8A, a first control signal provided after the first appearing special character, SC but before one of the subsequent succession of image data signals IDAT1 or IDAT2, that is, the data control signal CONT2, is designated as the S_master and it indicates that the first integrated signal IDAT1 follows it or it indicates that the second integrated signal IDAT2 follows it. As described above, if the signals for identifying the first and second integrated signals, respectively, are sequentially included in the pair of the first and second integrated signals provided to the master data driving chip LDI1 accordingly, the master data driving chip LDI1 may separate (disassemble) the second integrated signal from the first integrated signal without requiring an additional signal to indicate the end of one and start of the other and it may then transmit the second integrated signal alone to the slave data driving chip LDI2 optionally at a reduced rate.

That is, as shown in FIG. 7, the master data driving chip LDI1 may separate the image data signal IDAT1 included in the first integrated signal from the image data signal IDAT2 included in the second integrated signal without requiring an additional signal. The master data driving chip LDI1 and the salve data driving chip LDI2 may be driven respectively by the image data signals IDAT1_1, IDAT1_2, . . . included in the first integrated signal and the image data signals IDAT2_1, IDAT2_2, . . . which are separated from each other.

Figure 8B:
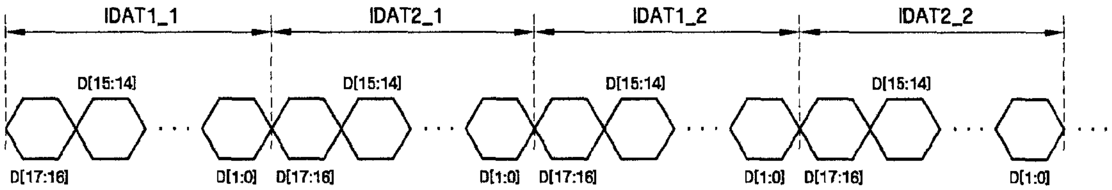
FIG. 8B is a diagram for explaining the arrangement of image data signals included in the pair of the first and second integrated signals provided to the master data driving chip of FIG. 7.

Referring to FIG. 8B, the image data signals IDAT1_1, IDAT1_2, . . . provided by the master data driving chip LDI1 to some of the pixels PX and the image data signals IDAT2_1, IDAT2_2, . . . provided by the slave data driving chip LDI2 to the ones of the pixels PX may be alternately arranged within the integrated signal. When the image data signals IDAT1_1, IDAT1_2, . . . and IDAT2_1, IDAT2_2, . . . are alternately arranged as described above, the master data driving chip LDI1 and the slave data driving chip LDI2 may alternately receive the image data signals IDAT1_1, IDAT1_2, . . . and IDAT2_1, IDAT2_2, . . . . Thus, the master data driving chip LDI1 and the slave data driving chip LDI2 may be driven simultaneously by the image data signals IDAT1_1, IDAT1_2, . . . and IDAT2_1, IDAT2_2, . . . , which are alternately provided thereto.

To save costs and/or improve reliability, a printed circuit board on which each of the data driving chips LDI1 through LDI8 is mounted and interconnect with one another may have inter-chip linking lines with poorer inter-chip transmission characteristics than direct transmission lines providing linkage between the signal controller 600 and each of the master ones of data driving chips LDI1 through LDI8. In FIG. 7, a second data transmission rate (e.g., 600 Mbps as shown in the drawing) between the master data driving chip LDI1 and the slave data driving chip LDI2 may be half the data transmission rate (e.g., half of 1.2 Gbps as shown in the drawing) between the signal controller 600 (see FIG. 3) and each of the master data driving chips LDI1, etc. Therefore, even if the circuit board on which each of the data driving chips LDI1 through LDI8 is mounted has poorer inter-chip transmission characteristics (whether intentionally or not), stable data transmission can be achieved.

Figure 9:
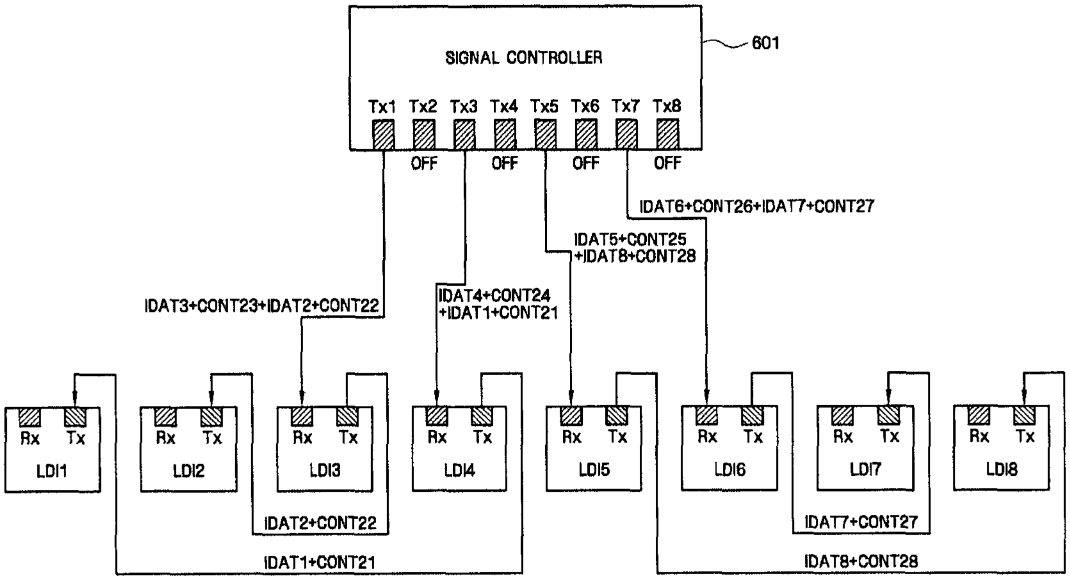
FIG. 9 is a block diagram illustrating signal transmission between a signal controller and a data driver included in a display device according to another exemplary embodiment.

Hereinafter, a display device according to another exemplary embodiment of the present invention will be described with reference to FIG. 9. FIG. 9 is a block diagram illustrating signal transmission between a signal controller 601 and a data driver included in a display device according to another exemplary embodiment. Elements substantially identical to those of the previous embodiment are indicated by like reference numerals, and thus repeat of their description will be omitted.

Referring to FIG. 9, in the display device according to one embodiment, four of the data driving chips, namely, LDI3 through LDI6 are located more closely adjacent to the signal controller 601 and these are determined to be the master data driving chips. That is, the data driving chips LDI3 through LDI6 located adjacent to the signal controller 601 are determined to be master data driving chips, and data driving chips LDI1, LDI2, LDI7 and LDI8, which are located further away from the signal controller 601 (and thus call for longer transmission paths), are determined to be slave data driving chips. The master data driving chips LDI3 through LDI6 may be connected respectively to the slave data driving chips LDI1, LDI2, LDI7 and LDI8 in a cascade manner as shown.

It can be understood from FIG. 9 that the display device according to the present embodiment has a shorter transmission line length between the signal controller 601 and each of the master data driving chips LDI3 through LDI6 than the transmission line (shown in FIG. 3) between the signal controller 600 and each of the master data driving chips LDI1, LDI3, LDI5 and LDI7 included in the display device 10 according to the previous embodiment. Thus, a data transmission rate between the signal controller 601 and each of the master data driving chips LDI3 through LDI6 can be increased or quality of transmission line decreased as desired.

In addition, it can be understood from FIG. 9 that the display device according to the illustrated embodiment has longer transmission lines between the master data driving chips LDI3 through LDI6 and the slave data driving chips LDI1, LDI2, LDI7 and LDI8, respectively, than the transmission lines (shown in FIG. 3) between the master data driving chips LDI1, LDI3, LDI5 and LDI7 and the slave data driving chips LDI2, LDI4, LDI6 and LDI8, respectively, included in the display device 10 according to the previous embodiment.

In addition, it can be understood from FIG. 9 that in one embodiment, the signal controller 600 includes a field programmable memory that is programmable to designate which slave data is to be bundled (assembled) with which master data according to how the master to slave connection lines are provided and that the signal controller 600 includes internal routing circuitry responsive to the field programmable memory for routing image data and control data accordingly for bundling as respective integrated data sent to the respective master data driving chips.

As described above, the circuit board on which each of the data driving chips LDI1 through LDI8 is mounted may have poorer inter-chip transmission characteristics than the direct transmission lines between the signal controller 601 and each of the data driving chips LDI1 through LDI8. Therefore, if a long transmission line is allocated to the circuit board on which each of the data driving chips LDI1 through LDI8 is mounted, more efficient data transmission can be achieved between the data driving chips LDI1 through LDI8 although the data driving chips LDI1 through LDI8 are connected to each other in a cascade manner which is characterized by a relatively slow data transmission rate.

While the present disclosure of invention has been directed to exemplary embodiments thereof, it will be understood by those of ordinary skill in the art that various changes in form and detail may be made therein without departing from the spirit and scope of the present disclosure. The exemplary embodiments should be considered in a descriptive sense only and not for purposes of limitation.

What is claimed is:

1. A display device comprising:

a signal controller which provides an integrated signal having data control signals embedded with image data signals and transmitted along a same transmission channel; and a plurality of data driving chips, each of which receives a respective integrated signal and is respectively configured to function as a selectable one of a master data driving chip or a slave data driving chip according to a data transmission rate required by each of the data driving chips to produce an image on the display device, wherein each of the master data driving chips is driven by a respective first integrated signal received directly from the signal controller, and a corresponding each of the slave data driving chips is driven by a respective second integrated signal received from its corresponding one of the master data driving chips, and wherein, when a data transmission rate required by each of the data driving chips exceeds a predetermined rate, the data driving chips are all determined by the signal controller to be master data driving chips.

2. The display device of claim 1, wherein a bundled pair of first and second integrated signals is transmitted from the signal controller to a first master data driving chip in a point-to-point manner and the second integrated signal of the bundle is then transmitted from the first master data driving chip to a corresponding one of the slave data driving chips in a cascade manner.

3. The display device of claim 1, further comprising a plurality of pixel units, each receiving a drive signal corresponding to a transmitted image data signal and displaying an image, wherein a first of the master data driving chips transmits respective image data signals to a respective first subset of the pixel units, where a corresponding first of the slave data driving chips transmits respective image data signals to a respective second subset of the pixel units, and the integrated signal transmitted form the signal controller comprises respective first image data signals directed to the first subset of the pixel units, and second image data signals directed to the second subset of the pixel units, wherein the first and second image data signals are alternately arranged relative to time within the integrated signal transmitted from the signal controller.

4. The display device of claim 1, wherein the first integrated signal is transmitted from the signal controller to at least one of the master data driving chips at a first transmission rate, and the second integrated signal is transmitted from a corresponding master data driving chip to its corresponding slave data driving chip at a slower second transmission rate.

5. The display device of claim 4, wherein the second transmission rate is equal to or less than half the first transmission rate.

6. The display device of claim 1, wherein, when the data transmission rate required by each of the data driving chips is equal to or less than the predetermined rate, some of the data driving chips are determined by the signal controller to be master data driving chips, and the other ones of the data driving chips are determined by the signal controller to be slave data driving chips.

7. The display device of claim 6, wherein the predetermined rate is half or less of a maximum data transmission rate allowed between the signal controller and each of the master data driving chips.

8. The display device of claim 1, wherein a subset of data driving chips located most closely adjacent to the signal controller are determined to be master data driving chips and another subset of data driving chips located further away from the signal controller are determined to be slave data driving chips.

9. The display device of claim 1, wherein the integrated signal comprises a plurality of clocks, each having a firstly positioned rising edge and a variably positioned falling edge, and where information represented by each clock is determined based on a temporal position of the falling edge of each clock relative to the immediately preceding rising edge.

10. The display device of claim 1, wherein the integrated signal comprises a first clock which represents 2-bits of an image data signal and a second clock which represents a special character informing the start of data belonging to a data control signal.

11. The display device of claim 10, wherein the integrated signal comprises a signal for identifying a start of the first integrated signal or a signal for identifying a start of the second integrated signal.

12. The display device of claim 1 wherein at least one of the data driving chips is respectively configured to function as a slave data driving chip.

13. A display device comprising:

a plurality of data driving chips; and a signal controller which determines each of the data driving chips to be a master data driving chip or a slave data driving chip and provides an integrated signal, which has a data control signal embedded together with an image data signal, to one or more of the data driving chips to configure each of the respective data driving chips to function as a selectable one of a master or slave data driving chip according to a data transmission rate required by each of the data driving chips to produce an image on the display device, wherein, when some of the data driving chips are master data driving chips while the other ones of the data driving chips are slave data driving chips, the signal controller provides a pair of first and second integrated signals to each of the master data driving chips, and each of the master data driving chips is driven by the first integrated signal received directly from the signal controller and transmits the second integrated signal to a corresponding one of the slave data driving chips, and wherein, when all of the data driving chips are the master data driving chips, the signal controller provides the integrated signal to each of the master data driving chips, and each of the master data driving chips is driven by the integrated signal.

14. The display device of claim 13, wherein the pair of the first and second integrated signals are transmitted to each of the master data driving chips in a point-to-point manner, and the second integrated signal is transmitted to each of the slave data driving chips in a cascade manner.

15. The display device of claim 13 wherein at least one of the data driving chips is respectively configured to function as a slave data driving chip.

* * * * *